United States Patent [19]

Spooner

[11] 4,394,050

[45] Jul. 19, 1983

[54] APPARATUS FOR SECURING AN ARTICLE TO A PLASTIC FRAME-LIKE STRUCTURE

[75] Inventor: Colin R. Spooner, Norfolk, England

[73] Assignee: Delorean Research Limited Partnership, Bloomfield Hills, Mich.

[21] Appl. No.: 242,469

[22] Filed: Mar. 11, 1981

[51] Int. Cl.$^3$ ............................................. A62B 35/00
[52] U.S. Cl. .................................. 297/468; 280/801; 403/167
[58] Field of Search ............... 297/468, 471, 464, 483; 280/801, 808; 403/167, 187, 201, 252, 259, 260, 264; 411/338, 339, 91

[56] References Cited

U.S. PATENT DOCUMENTS

| | | | |
|---|---|---|---|
| 1,871,668 | 8/1932 | Dawson | 403/167 X |
| 1,962,035 | 6/1934 | Reiter | 411/338 X |
| 2,758,440 | 8/1956 | Magid | 411/339 X |
| 3,014,563 | 12/1961 | Bratton | 403/167 |
| 3,339,953 | 9/1967 | Bohn | 411/339 X |
| 3,458,233 | 7/1969 | Kell | 403/187 |
| 3,836,172 | 9/1974 | Hildebrandt | 280/801 |
| 3,989,329 | 11/1976 | Benford | 312/214 |
| 4,004,301 | 1/1977 | Kaufman | 403/201 X |

FOREIGN PATENT DOCUMENTS 1506620 8/1968 Fed. Rep. of Germany ...... 297/468
2412766 9/1975 Fed. Rep. of Germany ...... 280/801

Primary Examiner—James T. McCall
Attorney, Agent, or Firm—Kenyon & Kenyon

[57] ABSTRACT

Disclosed is apparatus for anchoring, mounting, attaching or otherwise securing a seat belt to a plastic structure which forms part of or is connected to a vehicle body. The plastic structure includes two spaced plastic frame-like members which are adjacently disposed, each including an opening therein, with the axes of the openings aligned. The apparatus includes first and second mounting members which are connected together after the members have individually been positioned in the structure. A first mounting member has a flange which engages one of the frame-like members on its exterior side and extends through the opening of that frame-like member to the interior side of other frame-like member. The second mounting member is inserted through the opening in the other frame-like member and has a flanged portion which engages the exterior side of the second frame-like member, the first and second mounting members thereby sandwiching the second frame-like member. The second mounting member is attached to the first mounting member by a bolt which causes the mounting apparatus to be engaged in the plastic structure.

12 Claims, 3 Drawing Figures

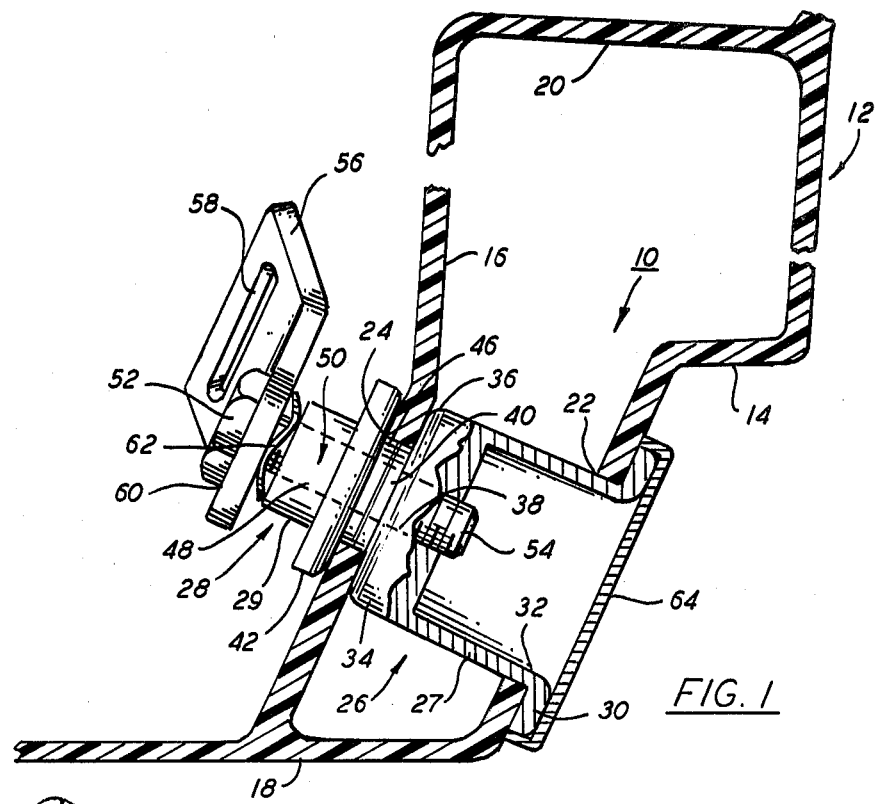
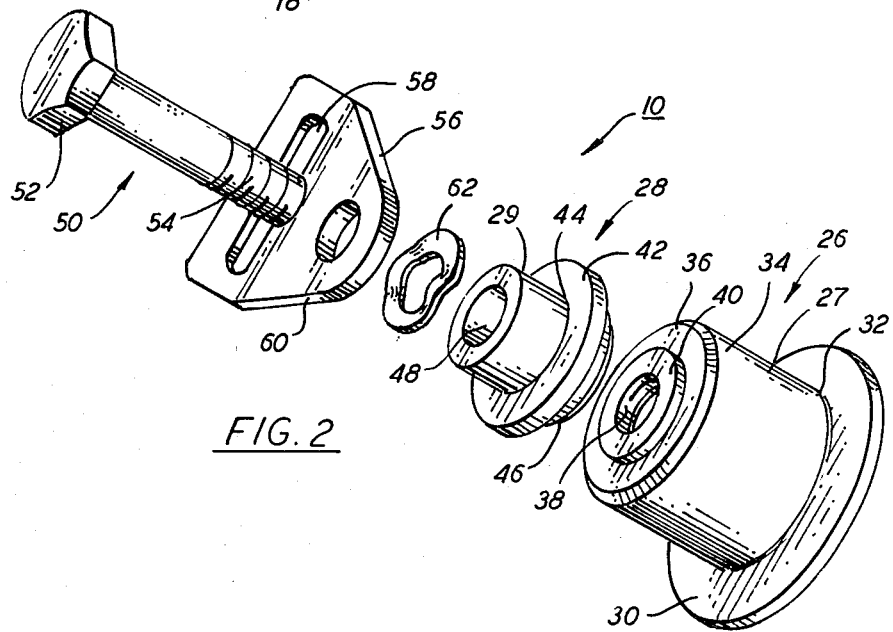

APPARATUS FOR SECURING AN ARTICLE TO A PLASTIC FRAME-LIKE STRUCTURE

BACKGROUND OF THE INVENTION

The present invention relates generally to apparatus for securing an article to a plastic plate, sheet or frame-like structure, and more particularly to apparatus for securing a seat belt in a vehicle having a plastic, for example, glass reinforced plastic body.

The anchoring, mounting, attaching or otherwise securing of an article which can be subjected to high forces to a plastic plate, sheet or frame-like structure presents problems not usually present in the securing of such articles to structures made of other material, for example, metal.

In particular, seat belt mounting hardware is conventionally bolted or welded to a metal vehicle body or to a metal part which is bolted or welded to the body. Where the vehicle body is made of plastic or glass reinforced plastic, such mounting of the seat belt hardware is not deemed suitable.

This application discloses apparatus for securing an article to a plastic plate, sheet or frame-like structure. In particular, the article can be a seat belt and the plastic structure can be part of or connected to a vehicle body.

OBJECTS AND SUMMARY OF THE INVENTION

It is an object of the present invention to provide apparatus for anchoring, mounting, attaching or otherwise securing an article to a plastic structure.

It is another object of the present invention to provide apparatus for anchoring, mounting, attaching or otherwise securing a seat belt to a plastic structure connected to or forming part of a vehicle body.

These and other objects of the invention are carried out by providing a plastic structure which includes two spaced and adjacently disposed plate, sheet or frame-like members and mounting apparatus which engages both frame-like members and which is attached to or includes means for receiving the article.

The plastic structure according to the invention includes two spaced and adjacently disposed frame-like members. The frame-like members include interior sides which face each other and exterior sides which face away from each other. Each frame-like member is engaged by the mounting apparatus, one frame-like member being engaged by the mounting apparatus on both sides and the other frame-like member being engaged by the mounting apparatus on at least one side. The mounting apparatus engages both frame-like members to resist forces acting in a direction away from the two frame-like members. Each frame-like member is provided with an opening therein to permit placement of the mounting apparatus relative to the frame-like members, the mounting apparatus projecting through both openings and engaging each frame-like member adjacent the respective opening.

The mounting apparatus includes first and second mounting members. The first mounting member has a first portion of increased perimeter which is greater than the perimeter of the opening in one of the frame-like members. The first mounting member extends into the opening in the one frame-like member towards the second frame-like member with the first portion engaging the one frame-like member adjacent the opening therein on the exterior side of the one frame-like member. The second mounting member has a second portion of increased perimeter which is greater than the perimeter of the opening in the other of the frame-like members. The second mounting member extends from the exterior of the other frame-like member into the opening in the other frame-like member with the second portion engaging the other frame-like member adjacent the opening therein on the exterior side of the other frame-like member. The first mounting member also includes another portion having a perimeter greater than that of the opening in the other frame-like member and which engages the interior side of the other frame-like member.

At least one of the first and second mounting members includes means for spacing the second portion of the second mounting member and the other portion of the first mounting member and means are provided for connecting the first and second mounting members together to engage them in the plastic structure, with the second portion of the second mounting member and the other portion of the first mounting member being spaced by the spacing means, the second frame-like member adjacent its opening being sandwiched between the second portion of the second mounting member and the other portion of the first mounting member. The second mounting member includes means for receiving the article.

With this arrangement, the first mounting member engages both the first frame-like member and the other frame-like member when the article is subjected to forces acting in a direction away from the frame-like members. Sandwiching of the second frame-like member between the first and second mounting members completes securing of the mounting apparatus in place and prevents movement of the mounting apparatus in a direction towards the two frame-like members.

To provide further strength, according to the invention, the two frame-like members are interconnected at at least one location near the mounting apparatus and preferably at two spaced locations near the mounting apparatus.

In the disclosed embodiments, the first mounting member includes a cylindrical body portion and its first portion comprises an annular flange connected to the cylindrical body portion adjacent one end thereof. When mounted, the cylindrical body portion extends through the opening in the first frame-like member with the annular flange engaging the exterior side of the first frame-like member adjacent the opening. The other end of the first mounting member contacts the interior side of the second frame-like member adjacent its opening. The second mounting member also includes a cylindrical body portion and its second portion comprises an annular flange or rib secured to the cylindrical body portion. When mounted, the annular flange of the second mounting member contacts the exterior side of the first frame-like member adjacent its opening, with the cylindrical body portion projecting away from the exterior side of the other frame-like member. The first and second mounting members are connected together to sandwich the other frame-like member adjacent its opening between the annular flange of the second mounting member and the cylindrical body portion of the first mounting member.

The first mounting member includes a threaded bore therein and the second mounting member includes a bore extending therethrough, the bores being registered when the members are mounted. A threaded bolt connects the first and second mounting members together to engage them in the plastic structure. Both the first and second mounting members include an annular section of reduced diameter disposed at the respective ends of the cylindrical body portions of the two members. The annular portions have a combined thickness which is generally equal to the thickness of the other frame-like member. The annular portions thereby act as a spacer between cylindrical body portions of first and second mounting members.

The second mounting member has means for receiving the article, or the article is attached to the second mounting member.

Where the article is a seat belt, a bracket having a slot therein suitable for receiving the seat belt is provided. The bracket has a hole therein and is secured to the second mounting member by the bolt.

The length of the second mounting member can be selected so that the second mounting member projects beyond the first frame-like member by a predetermined distance. If desired, a panel such as decorative or cover panel can be provided to obscure the other frame-like member. The panel has a hole therethrough and is disposed so that the second mounting member projects into the hole and is generally flush with the exterior surface of the panel.

These and other aspects of the invention will be more apparent from the following description of the preferred embodiments thereof when considered with the accompanying drawings and appended claims.

BRIEF DESCRIPTION OF THE DRAWINGS

The present invention is illustrated by way of example and not limitation in the figures of the accompanying drawings in which like references indicate similar parts and in which:

FIG. 1 is an elevation view partially in section and partially in perspective of mounting apparatus for mounting a seat belt to a plastic structure connected to or forming part of a vehicle body in accordance with the invention;

FIG. 2 is an exploded perspective view of the mounting apparatus of FIG. 1; and

DESCRIPTION OF THE PREFERRED EMBODIMENT

Figure 3:
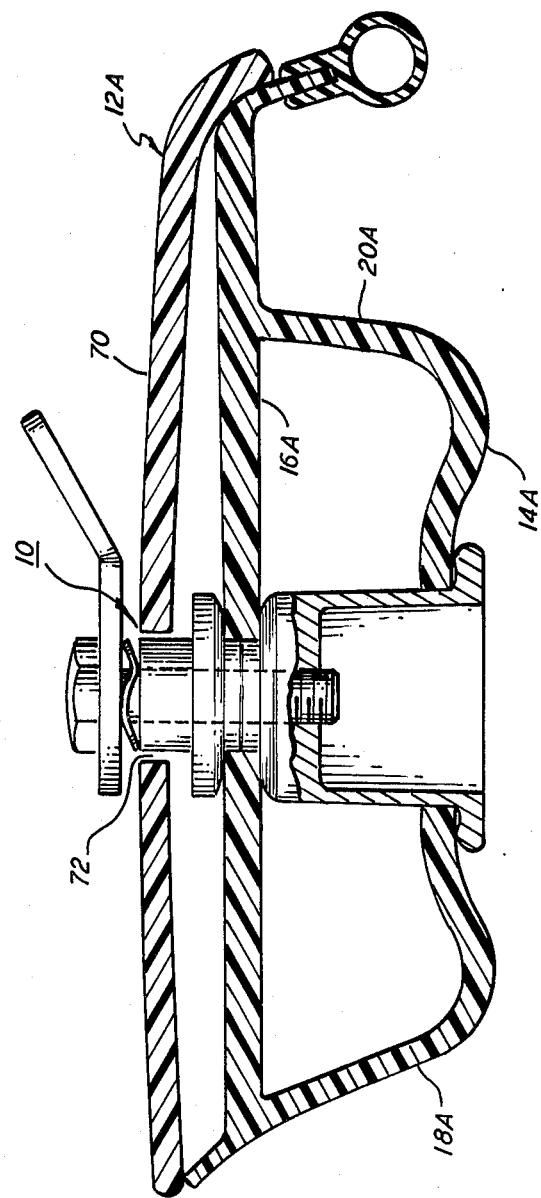
FIG. 3 is an elevation view of the mounting apparatus of FIG. 1 disposed in another plastic structure with a panel disposed to obscure the plastic structure.

Referring now more particularly to the drawings, mounting apparatus 10 for attaching a seat belt (not shown) to a plastic structure which can be made of glass reinforced plastic, is illustrated. According to the invention, the plastic structure 12 can be connected to or form part of a vehicle body and includes two plastic frame-like members 14 and 16 which are spaced and adjacently disposed. The frame-like members are interconnected by two further plastic members 18 and 20. The resulting structure according to the invention forms a closed polygon in cross-section or a beam-like structure in perspective, which in combination with the mounting apparatus strengthens the plastic structure in the area of the seat belt mounting apparatus. The plastic frame-like members 14 and 16 each include an opening 22 and 24 having aligned axes.

The mounting apparatus 10 includes a first mounting member 26 having a generally cylindrical body 27 and a second mounting member 28 having a generally cylindrical body 29. The first mounting member 26 includes an annular flanged portion 30 having a greater diameter than that of the cylindrical body 27 and is connected to or forms one end 32 of the body 27. The first mounting member 26 can be generally hollow except for a solid portion 34 at the end 36 of the body portion in which a threaded bore 38 is centrally provided. Connected or formed at the end 36 of the body 27 is another annular portion 40 having a diameter less than the diameter of the cylindrical body 27.

The second mounting member 28 includes an annular flanged portion 42 having a diameter that is larger than the diameter of the cylindrical body 29 and is connected to or formed adjacent an end 44 of the body 29. Connected to or formed adjacent the flanged portion 42 at the end 44 is another annular portion 46 having a diameter which is generally equal to the diameter of the cylindrical body 29. The second mounting member 28 includes a central bore 48 extending therethrough.

A bolt 50 having a head 52 and a threaded shank portion 54 is provided to connect the members 26 and 28 together. A bracket 56 having a slotted opening 58 for receiving a seat belt and an opening 60 is connected to the first and second members by means of the bolt 50 extending through the opening 60. A lock washer 62 is disposed between the seat belt bracket 56 and the second mounting member 28.

A dust cover 64 is disposed about the flanged portion 30 of the first mounting member 26 to prevent foreign matter from entering into the interior of member 26.

Apparatus 10 is assembled into the plastic structure 12 as follows. The first mounting member 26 is inserted through the opening 22 of the first frame-like member 14 from the exterior side thereof with the end 36 of the body 27 contacting the other frame-like member 16 and the flanged portion 30 engaging the exterior side of the frame-like member 14 adjacent opening 22. The annular portion 40 of the first mounting member 26 is disposed in the opening 24 of the other frame-like member 16. The second mounting member 28 is inserted into opening 44 from the exterior side of the other frame-like member 16. The annular portion 46 of the second mounting member is disposed in the opening 24 and contacts the annular portion 40 of member 26. The flanged portion 42 engages the exterior side of the other frame-like member 16 adjacent the opening 24. The lock washer and seat belt bracket 56 are disposed over the bore 50 in the second mounting member 28 and the bolt 50 is tightened into the threaded bore of the first mounting member 26 to connect the members and engage them in the plastic structure. The bolt may be of a length so as to protrude through the threaded bore 38 into the hollow interior of the first mounting member 26.

The end 36 of the first mounting member 26 and the edge of the flange portion 42 facing the other frame-like member 16 are rounded so as to avoid engagement of the frame-like member by a sharp edge. The edge of the annular portion 30 as also rounded.

Referring now to FIG. 3, the apparatus 10 is shown mounted in a plastic structure 12A which is slightly different from the structure 12 shown in FIG. 1. As in the structure of FIG. 1, the structure 12A in FIG. 3 also includes two interconnecting members 18A and 20A for the two frame-like members 14A and 16A. In the embodiment in FIG. 3, a cover or decorative panel 70 is provided spaced from and adjacent to the second frame-like member 16A. The panel 70 includes an opening 72 into which the second mounting member 28 projects. The panel 70 obscures the plastic structure 12A.

The first and second members and the seat belt bracket can be made of a suitable material, for example, metal.

The advantages of the present invention, as well as certain changes or modifications of the disclosed embodiments thereof, will be readily apparent to those skilled in the art. It is the applicant's intention to cover by his claims all those changes or modifications which could be made to the embodiment of the invention herein chosen for the purpose of the disclosure without departing from the spirit and the scope of the invention.

What is claimed is:

1. Apparatus for securing an article to a plastic structure, the plastic structure including two spaced and adjacently disposed frame-like members each having an opening therein, the apparatus comprising a first mounting member having a first portion of increased perimeter which is greater than the perimeter of the opening in one of the frame-like members, said first mounting member being adapted to extend into the opening in the one frame-like member with the first portion being adapted to engage the one frame-like member adjacent the opening therein on an exterior side thereof, a second mounting member having a second portion of increased perimeter which is greater than the perimeter of the opening in the other of the frame-like members, said second mounting member being adapted to extend into the opening in the other frame-like member with the second portion engaging the other frame member adjacent the opening therein on an exterior side thereof, said first mounting member including another portion adapted to engage an interior side of said other frame-like member, at least one of said first and second mounting members including means for spacing said second portion of said second mounting member and said other portion of said first mounting member, and means for connecting said first and second mounting members together to engage them in the plastic structure with said second portion of said second mounting member and said other portion of said first mounting member spaced by said spacing means and oppositely disposed, said second mounting member including means for receiving said article.

2. Apparatus for securing an article to a plastic structure comprising the combination of two spaced and adjacently disposed plastic frame-like members, each having an opening therein, a first mounting member having a first portion of increased perimeter which is greater than the perimeter of the opening in one of the frame-like members, said first mounting member extending into the opening in the one frame-like member with the first portion engaging the one frame-like member adjacent the opening therein on an exterior side thereof, a second mounting member having a second portion of increased perimeter which is greater than the perimeter of the opening in the other of the frame-like members, said second mounting member extending into the opening in the other frame-like member with the second portion engaging the other frame-like member adjacent the opening therein on an exterior side of the other frame member, said first mounting member including another portion which engages an interior side of said other frame-like member, at least one of said first and second mounting members including means for spacing said second portion of said second mounting member and said other portion of said first mounting member, and means for connecting said first and second mounting members together to engage them in the plastic structure with said second portion of said second mounting member and said other portion of said first mounting member being spaced by said spacing means and oppositely disposed, said second mounting member including means for receiving said article.

3. In a plastic structure, apparatus for securing an article to the structure, the apparatus comprising a first frame-like plastic member having a first opening therein and a second frame-like plastic member having a second opening therein, the first and second frame-like members being connected to said structure and being spaced and adjacently disposed, a first mounting member extending into said first opening in said first frame-like member and having a first portion of increased perimeter which is greater than the perimeter of said first opening, said first portion engaging said first frame-like member adjacent said first opening on an exterior side thereof, a second mounting member extending into said second opening in said second frame-like member and having a second portion of increased perimeter which is greater than the perimeter of said second opening, said second portion engaging said second frame-like member adjacent said second opening on an exterior side thereof, said first mounting member including another portion engaging an interior side of said second frame-like member, at least one of said first and second mounting members including means for spacing said second portion of said second mounting member and said other portion of said first mounting member, and means for connecting said first and second mounting members together to engage them in the plastic structure with said second portion of said second mounting member and said other portion of said first mounting member being spaced by said spacing means and oppositely disposed, said second mounting member including means for receiving said article.

4. The apparatus of claims 1, 2 or 3, wherein each of said mounting members includes a generally cylindrical body portion and said first and second portions are generally annular and connected to a respective cylindrical body portion.

5. The apparatus of claims 1, 2 or 3, wherein said first portion is disposed adjacent an end of said first mounting member, an opposed end of said first mounting member which when the mounting members are mounted extends through the opening in the first frame-like member to the other frame-like member and engages the other frame-like member on the interior side thereof.

6. The apparatus of claims 1, 2 or 3, wherein said second portion is spaced inwardly from an end of said second mounting member, when said mounting members are mounted said end of said second member extending into said opening in said other frame-like member and comprising said spacing means, said end of said second mounting member being disposed adjacent to an end of said first mounting member when said first and second mounting members are connected together.

7. The apparatus of claims 1, 2 or 3, wherein said spacing means comprises a portion of reduced perimeter disposed at an end of said first mounting member, when said mounting members are mounted said reduced perimeter portion extending into said opening of said other frame-like member, said reduced perimeter portion being disposed adjacent to an end of said second mounting member when said first and second mounting members are connected.

8. The apparatus of claims 1, 2 or 3, wherein said means for connecting said first and second mounting members comprises a threaded bore in said first mounting member, a bore in said second mounting member which is registered with the threaded bore when the mounting members are mounted, and a threaded bolt having a head engaging one end of said second mounting member and extending through said bore in said second mounting member to said threaded bore, whereupon tightening the bolt into the threaded bore draws said first and second mounting members together.

9. The apparatus of claim 8 and including a bracket having a slot therein adapted to receive a seat belt and an opening therein, when mounted said bracket being disposed with its opening in registry with the bore in said second mounting member so that said bracket can be secured to said mounting members by said bolt.

10. The apaparatus of claims 1, 2 or 3, and including a bracket having a slot therein adapted to receive a seat belt, and means for connecting the bracket to said second mounting member.

11. The apparatus of claims 2 or 3 and comprising means for spacedly connecting said first and second frame-like members together at at least one location near the openings.

12. The apparatus of claims 1, 2 or 3, wherein said second portion is spaced from an end of said second mounting member such that said second mounting member can extend through an opening in a panel extending adjacent to the exterior side of said other frame-like member.

* * * * *